(12) United States Patent
Doyle et al.

(10) Patent No.: US 9,154,432 B2
(45) Date of Patent: Oct. 6, 2015

(54) METHOD AND APPARATUS TO CONTROL TX/RX AMSDU SIZE BASED ON THE NEGOTIATED MAXIMUM TRANSMISSION UNIT IN THE TUNNEL BETWEEN A CONTROLLER AND AN ACCESS POINT

(71) Applicant: Aruba Networks, Inc., Sunnyvale, CA (US)

(72) Inventors: Aidan P. Doyle, Mountain View, CA (US); Bhanu S. Gopalasetty, San Ramon, CA (US); Dong H. Nguyen, San Jose, CA (US); Sathish Damodaran, San Jose, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 125 days.

(21) Appl. No.: 13/918,673

(22) Filed: Jun. 14, 2013

(65) Prior Publication Data
US 2014/0369210 A1    Dec. 18, 2014

(51) Int. Cl.
*H04W 4/00*   (2009.01)
*H04L 12/805*   (2013.01)

(52) U.S. Cl.
CPC .............. *H04L 47/365* (2013.01); *H04L 47/36* (2013.01)

(58) Field of Classification Search
None
See application file for complete search history.

(56) References Cited

U.S. PATENT DOCUMENTS

| | | | |
|---|---|---|---|
| 2004/0100991 A1* | 5/2004 | Samadi et al. | 370/473 |
| 2006/0153232 A1* | 7/2006 | Shvodian | 370/468 |
| 2011/0305143 A1* | 12/2011 | Gray et al. | 370/242 |
| 2012/0155460 A1* | 6/2012 | Gu et al. | 370/389 |
| 2013/0128897 A1* | 5/2013 | Tiernan et al. | 370/442 |
| 2013/0223337 A1* | 8/2013 | Choo | 370/328 |
| 2013/0343275 A1* | 12/2013 | Merlin et al. | 370/328 |

* cited by examiner

*Primary Examiner* — John Blanton

(57) ABSTRACT

A method includes selecting upstream and downstream aggregated MAC service data unit (AMSDU) sizes for communications between a client device, an access point, and an controller in a network system. The upstream and downstream AMSDU sizes may be separately selected based on the maximum transmission unit (MTU) size for communications in a secure tunnel between the controller and the access point to avoid fragmentation and reassembly of AMSDUs transmitted in a single MTU. The upstream and downstream AMSDU sizes may be selected to be less or equal to the MTU size.

25 Claims, 4 Drawing Sheets

METHOD AND APPARATUS TO CONTROL TX/RX AMSDU SIZE BASED ON THE NEGOTIATED MAXIMUM TRANSMISSION UNIT IN THE TUNNEL BETWEEN A CONTROLLER AND AN ACCESS POINT

TECHNICAL FIELD

The present disclosure relates to selecting aggregated MAC service data unit (AMSDU) sizes for communications between a client device, an access point, and a controller based on a maximum transmission unit (MTU) size for communications in a secure tunnel between the controller and the access point.

BACKGROUND

Over the last decade, there has been a substantial increase in the use and deployment of wireless client devices, from dual-mode smartphones to tablets capable of operating in accordance with a particular Institute of Electrical and Electronics Engineers (IEEE) standard. With "wireless" becoming the de-facto medium for connectivity among users, it has become increasingly important for network systems to intelligently manage connections.

In some systems, wireless client devices may connect with an access point over a wireless connection to transfer and receive data. In upstream communications, the wireless client devices aggregate packets into aggregated MAC service data units (AMSDUs) for transmission to the access point. Similarly, in downstream communications the wireless client devices deaggregate packets transmitted in AMSDUs from the access point.

In some systems, the access point may establish a tunnel with a controller to enable centralized security, thereby eliminating packet tampering in intermediate devices. In transmissions through the tunnel, AMSDUs may be fragmented such that they may be transmitted in maximum transmission units (MTUs). This fragmentation may lead to a reduction of performance for a datapath between the client device, the controller, and the access point as a result of significant processing and delay overhead.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings in which like references indicate similar elements. It should be noted that references to "an" or "one" embodiment in this disclosure are not necessarily to the same embodiment, and they mean at least one. In the drawings.

DETAILED DESCRIPTION

Figure 1:
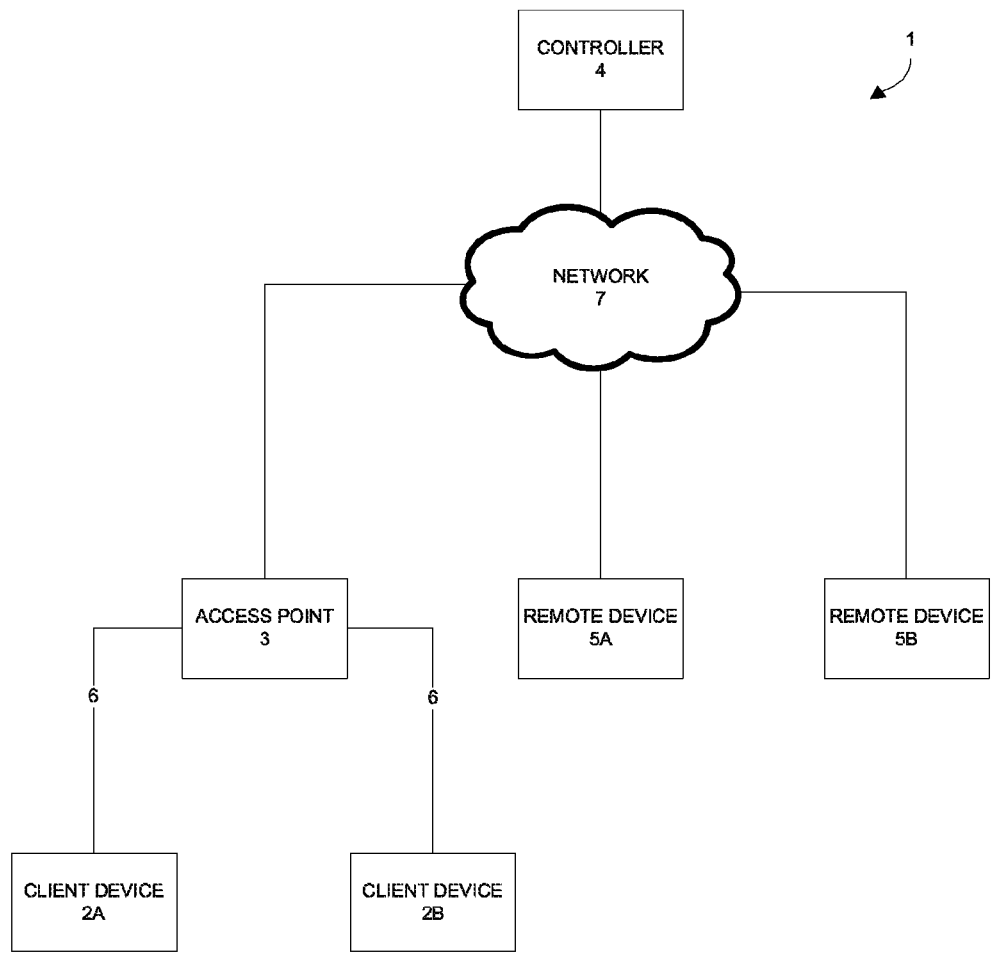
FIG. 1 shows a block diagram example of a network system in accordance with one or more embodiments.

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

Herein, certain terminology is used to describe features for embodiments of the disclosure. For example, the term "digital device" generally refers to any hardware device that includes processing circuitry running at least one process adapted to control the flow of traffic into the device. Examples of digital devices include a computer, a tablet, a laptop, a desktop, a netbook, a server, a web server, authentication server, an authentication-authorization-accounting (AAA) server, a Domain Name System (DNS) server, a Dynamic Host Configuration Protocol (DHCP) server, an Internet Protocol (IP) server, a Virtual Private Network (VPN) server, a network policy server, a mainframe, a television, a content receiver, a set-top box, a video gaming console, a television peripheral, a printer, a mobile handset, a smartphone, a personal digital assistant "PDA", a wireless receiver and/or transmitter, an access point, a base station, a communication management device, a router, a switch, and/or a controller.

It is contemplated that a digital device may include hardware logic such as one or more of the following: (i) processing circuitry; (ii) one or more communication interfaces such as a radio (e.g., component that handles the wireless data transmission/reception) and/or a physical connector to support wired connectivity; and/or (iii) a non-transitory computer-readable storage medium (e.g., a programmable circuit; a semiconductor memory such as a volatile memory and/or random access memory "RAM," or non-volatile memory such as read-only memory, power-backed RAM, flash memory, phase-change memory or the like; a hard disk drive; an optical disc drive; etc.) or any connector for receiving a portable memory device such as a Universal Serial Bus "USB" flash drive, portable hard disk drive, or the like.

Herein, the terms "logic" (or "logic unit") are generally defined as hardware and/or software. For example, as hardware, logic may include a processor (e.g., a microcontroller, a microprocessor, a CPU core, a programmable gate array, an application specific integrated circuit, etc.), semiconductor memory, combinatorial logic, or the like. As software, logic may be one or more software modules, such as executable code in the form of an executable application, an application programming interface (API), a subroutine, a function, a procedure, an object method/implementation, an applet, a servlet, a routine, source code, object code, a shared library/dynamic load library, or one or more instructions. These software modules may be stored in any type of a suitable non-transitory storage medium, or transitory computer-readable transmission medium (e.g., electrical, optical, acoustical or other form of propagated signals such as carrier waves, infrared signals, or digital signals).

Lastly, the terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps or acts are in some way inherently mutually exclusive.

FIG. 1 shows a block diagram example of a network system 1 in accordance with one or more embodiments. The network system 1, as illustrated in FIG. 1, is a digital system that may include a plurality of digital devices such as one or more client devices 2A and 2B, an access point 3, a controller 4, and one or more remote devices 5A and 5B. In one or more embodiments, the network system 1 may include more or less devices than the devices illustrated in FIG. 1, which may be connected to other devices within the network system 1 via wired and/or wireless mediums. For example, although shown as two client devices 2A and 2B connected to the access point 3, in other embodiments more than two client devices 2 may be connected to the access point 3.

Figure 2:
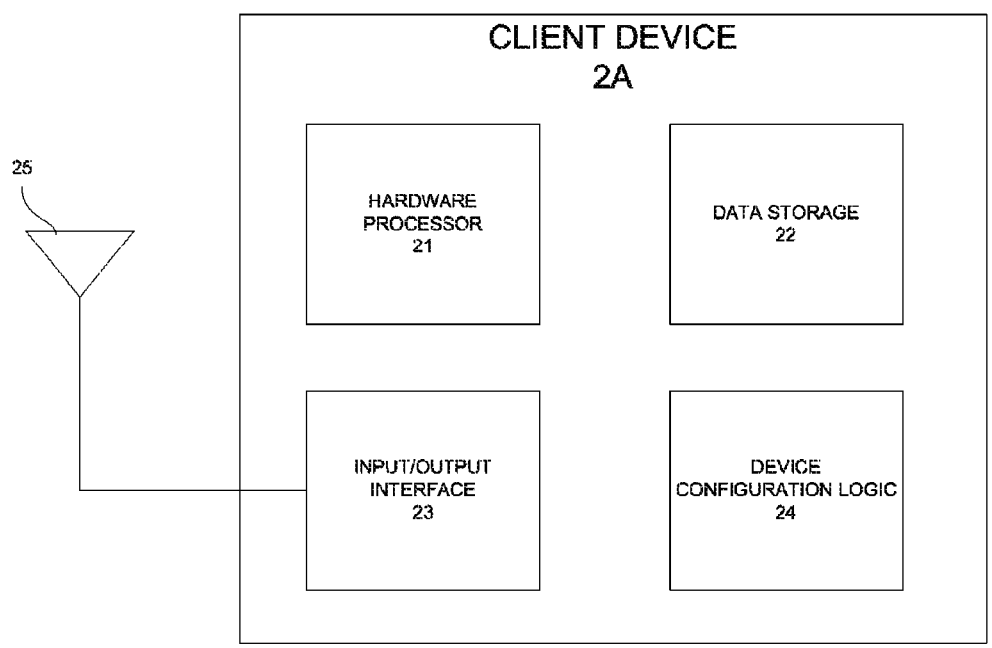
FIG. 2 shows a block diagram example of a client device in accordance with one or more embodiments.

In one embodiment, as shown in FIG. 2, the client device 2A may be a network device that comprises one or more of: a hardware processor 21, data storage 22, an input/output (I/O) interface 23, and device configuration logic 24. Other client devices 2 within system 1 may be configured similarly or differently than the client device 2A shown in FIG. 2.

The data storage 22 of the client device 2A may include a fast read-write memory for storing programs and data during client device 2A's operations and a hierarchy of persistent memory, such as Read Only Memory (ROM), Erasable Programmable Read Only Memory (EPROM), and/or Flash memory for example, for storing instructions and data needed for the startup and/or operations of the client device 2A. The data storage 22 may store data that is to be transmitted from the client device 2A or data that is received by the client device 2A. In an embodiment, the data storage 22 is a distributed set of data storage components.

In one embodiment, the I/O interface 23 corresponds to one or more components used for communicating with other devices (e.g., the access point 3) via wired or wireless signals. The I/O interface 23 may include a wired network interface such as an IEEE 802.3 Ethernet interface and/or a wireless interface such as an IEEE 802.11 WiFi interface. The I/O interface 23 may communicate with the access point 3 over corresponding wireless channels 6 in the system 1. The I/O interface 23 may include one or more antennas 25 for communicating with the access point 3 and other wireless devices in the network system 1. For example, multiple antennas 25 may be used for forming transmission beams to the access point 3 through adjustment of gain and phase values for corresponding antenna 25 transmissions. The generated beams may avoid objects and create an unobstructed path to the access point 3.

In one embodiment, the hardware processor 21 is coupled to the data storage 22 and the I/O interface 23. The hardware processor 21 may be any processing device including, but not limited to a MIPS/ARM-class processor, a microprocessor, a digital signal processor, an application specific integrated circuit, a microcontroller, a state machine, or any type of programmable logic array.

In one embodiment, the device configuration logic 24 includes one or more functional units implemented using firmware, hardware, software, or a combination thereof for configuring parameters associated with the access point 3 and the client device 2A. In one embodiment, the device configuration logic 24 may be configured to adjust the size of aggregated MAC service data units (AMSDUs) transmitted between the client device 2A and the access point 3 based on the maximum transmission unit (MTU) size for communications in a secure tunnel between the controller 4 and the access point 3 as will be described in further detail below.

The access point 3 may be any device that can associate with the client devices 2 to transmit and receive data over the wireless channels 6. For example, the access point 3 may facilitate the transfer of data (1) from the client devices 2 to the remote devices 5 and/or (2) to the client devices 2 from the remote devices 5. In one embodiment, the access point 3 may correspond to a network device such as a wireless access point, a switch, a router, or any combination thereof. For example, the access point 3 may be a router or any device that may be configured as a hotspot (e.g., a cell phone, a tablet, a laptop, etc.). The access point 3 may be communicatively coupled to other networks, such as network 7 to send and receive data to the remote devices 5. The data may include, for example, web data, video data and/or voice data. In one embodiment, the access point 3 is a digital device that includes a hardware processor, memory hierarchy, and input/output (I/O) interfaces including a wireless interface, such as an IEEE 802.11 wireless interface. In one embodiment, the configuration of the components within the access point 3 may be similar to those discussed above in relation to the client device 2A.

In one embodiment, the controller 4 is coupled to the network 7 through a wireless or wired connection that facilitates the transfer of data between the access point 3 and the controller 4. In one embodiment, the controller 4 and the access point 3 may establish a tunnel for enabling centralized security, thereby eliminating any packet tampering in intermediate devices. The tunnel may be implemented using any protocol suite for securing the transmission of packets through the use of authentication and encryption operations.

In one embodiment, the controller 4 may correspond to a network device such as a switch, a router, or any combination thereof. In one embodiment, the controller 4 is a digital device that includes a hardware processor, memory hierarchy, and input/output (I/O) interfaces including a wired interface, such as an IEEE 802.3 interface, and/or wireless interface, such as an IEEE 802.11 interface. In one embodiment, the configuration of the components within the controller 4 may be similar to those discussed above in relation to the client device 2A.

In one embodiment, the access point 3, the controller 4, and the remote devices 5 are coupled to the network 7. The network 7 may be any network capable of transferring data between the access point 3, the controller 4, and the remote devices 5. For example, the network 7 may include one or more wired or wireless routers, switches, and other digital networking devices that operate using one or more protocols (e.g., IEEE 802.3 and IEEE 802.11).

The remote devices 5 may be any wireless or wired electronic devices capable of receiving and transmitting video or other data streams, such as personal computers, laptop computers, netbook computers, wireless music players, portable telephone communication devices, smart phones, tablets, and digital televisions. In one embodiment, the remote devices 5 are digital devices that include a hardware processor, memory hierarchy, and input/output (I/O) interfaces including a wired and/or wireless interface such as an IEEE 802.3 interface. In one embodiment, the configuration of the components within the remote devices 5 may be similar to those discussed above in relation to the client device 2A.

Figure 3A:
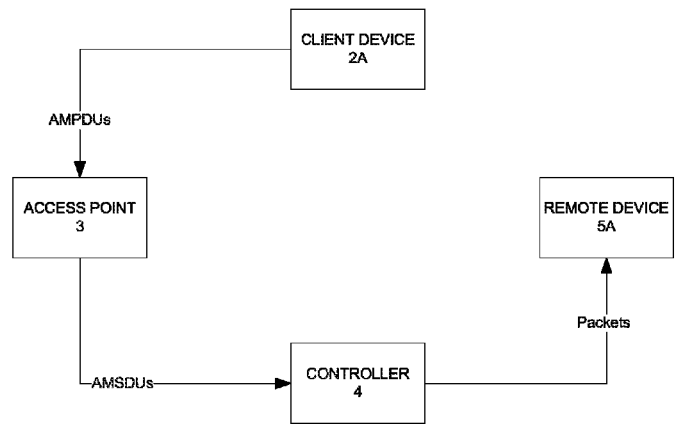
FIG. 3A shows upstream data flow from a client device to a remote device in accordance with one or more embodiments.

FIG. 3A shows upstream data flow from the client device 2A to the remote device 5A. In this embodiment, one or more data packets are generated on the client device 2A. The data packets may correspond to any type of data, including web data, video data, and/or voice data. In one embodiment, the data packets are IEEE 802.3 compliant data packets generated by the hardware processor 21 and stored in the data storage 22.

The client device 2A may aggregate two or more data packets into an upstream aggregated MAC service data unit (AMSDU). The size of the upstream AMSDU may be negotiated by the client device 2 and the access point 3. For example, the upstream AMSDU size may be set to one of 3895 bytes, 7991 bytes, and 11454 bytes. In one embodiment, the upstream AMSDU size is determined based on the maximum transmission unit (MTU) size between the access point 3 and the controller 4. In one embodiment, the upstream AMSDU size may be set to be less than or equal to the MTU size for the secure tunnel between the access point 3 and the controller 4. For example, when the MTU size between the access point 3 and the controller 4 is 9000 bytes, the upstream AMSDU size may be set to either 3895 bytes or 7991 bytes.

The client device 2 may thereafter perform authentication and encryption operations on the AMSDU frame using shared authentication and security information with the controller 4. Authentication and encryption operations ensure that the AMSDU is not compromised while being transferred over the wireless channels 6 to the access point 3. Any form of authentication and encryption may be used by the client device 2.

Following the aggregation of packets into an AMSDU frame and possible encryption of the AMSDU, the client device 2A may aggregate two or more AMSDUs into an aggregated MAC protocol data unit (AMPDU). The AMPDU may be transmitted over the wireless channels 6 to the access point 3. The access point 3 deaggregates the AMPDU into the original AMSDUs and transmits the AMSDUs to the controller 4. In one embodiment described above, the upstream AMSDU size is set to be less than or equal to the MTU size of the tunnel between the access point 3 and the controller 4. In this embodiment, a single AMSDU may be transmitted through the tunnel without fragmentation of the AMSDU since the size of the AMSDU is less than or equal to the size of the MTU for the tunnel between the access point 3 and the controller 4. By eliminating fragmentation of AMSDUs during transmission between the access point 3 and the controller 4, performance of the upstream datapath is improved through the elimination of fragmentation processing delays. In one embodiment, the upstream AMSDU size is determined through negotiations between the client device 2A and the access point 3. The upstream AMSDU size may be periodically updated upon the detection of a changed MTU size.

Upon receipt, the controller 4 may decrypt the AMSDU using the authentication and security information shared with the client device 2A. The controller 4 may thereafter deaggregate the AMSDU into two or more data packets. The data packets may thereafter be transmitted to the remote device 5A through the external network 7. The transmission may use any suitable protocol, including the Transmission Control Protocol/Internet Protocol standards.

Figure 3B:
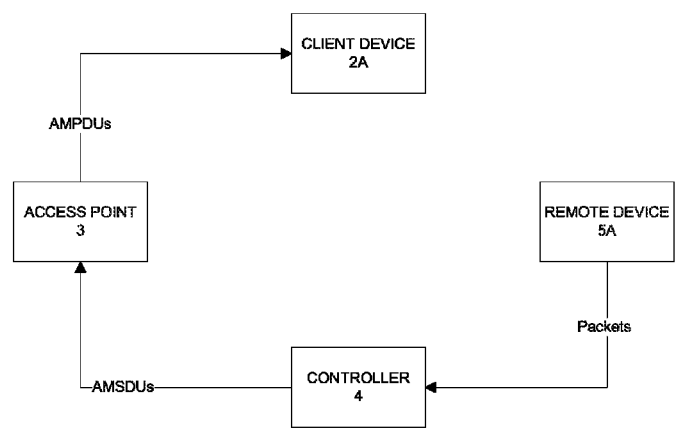
FIG. 3B shows downstream data flow from a remote device to a client device in accordance with one or more embodiments.

FIG. 3B shows downstream data flow from the remote device 5A to the client device 2A. In this embodiment, one or more data packets are generated on the remote device 5A. The data packets may correspond to any type of data, including web pages, video data, and/or voice data. In one embodiment, the data packets are IEEE 802.3 compliant data packets generated by a hardware processor and/or stored within data storage within the remote device 5A.

The remote device 5A transmits the data packets to the controller 4 through the external network 7. The transmission may use any suitable protocol, including the Transmission Control Protocol/Internet Protocol standards.

The controller 4 may aggregate two or more encrypted data packets into a downstream AMSDU. The size of the downstream AMSDUs may be negotiated by the client device 2 and the access point 3 in a similar fashion as described above in relation to the upstream AMSDUs. For example, the downstream AMSDU size may be set to one of 3895 bytes, 7991 bytes, and 11454 bytes. In one embodiment, the downstream AMSDU size is determined based on the MTU size between the access point 3 and the controller 4. In one embodiment, the downstream AMSDU size may be set to be less than or equal to the MTU size for the secure tunnel between the access point 3 and the controller 4. For example, when the MTU size between the access point 3 and the controller 4 is 9000 bytes, the downstream AMSDU size may be set to either 3895 bytes or 7991 bytes. Although both the upstream and downstream AMSDU sizes may be set based on the MTU size, in some embodiments the upstream and downstream AMSDU sizes are distinct and different. For example, when the MTU size between the access point 3 and the controller 4 is 9000 bytes, the upstream AMSDU size may be set to 3895 bytes and the downstream AMSDU size may be set to 7991 bytes.

In one embodiment, the controller 4 may perform authentication and encryption operations on each AMSDU using authentication and security information shared with the client device 2A. Authentication and encryption operations ensure that the data packets are not compromised while being transferred over the wireless channels 6 to the client device 2A. Any form of authentication and encryption may be used by the controller 4.

Following the aggregation of data packets and possible encryption of the AMSDU, each downstream AMSDU may be transmitted to the access point 3 through the secure tunnel. Since, the size of the downstream AMSDU is less than or equal to the size of the MTU, fragmentation of the AMSDUs does not occur. By eliminating fragmentation of AMSDUs during transmission between the controller 4 and the access point 3, performance of the downstream datapath is improved through the elimination of fragmentation processing delays.

Upon receipt, the access point 3 may aggregate two or more AMSDUs into an AMPDU and transmit the AMPDU over the wireless channels 6 to the client device 2A. Following receipt, the client device 2A may deaggregate the AMPDU into the original two or more AMSDUs. Each AMSDU may be decrypted using the authentication and security information shared between the controller 4 and the client device 2A. The decrypted AMSDU may be deaggregated into two or more data packets. The data packets may thereafter be processed by one or more applications running on the hardware processor 21 and/or stored in the data storage 22 of the client device 2A.

Figure 4:
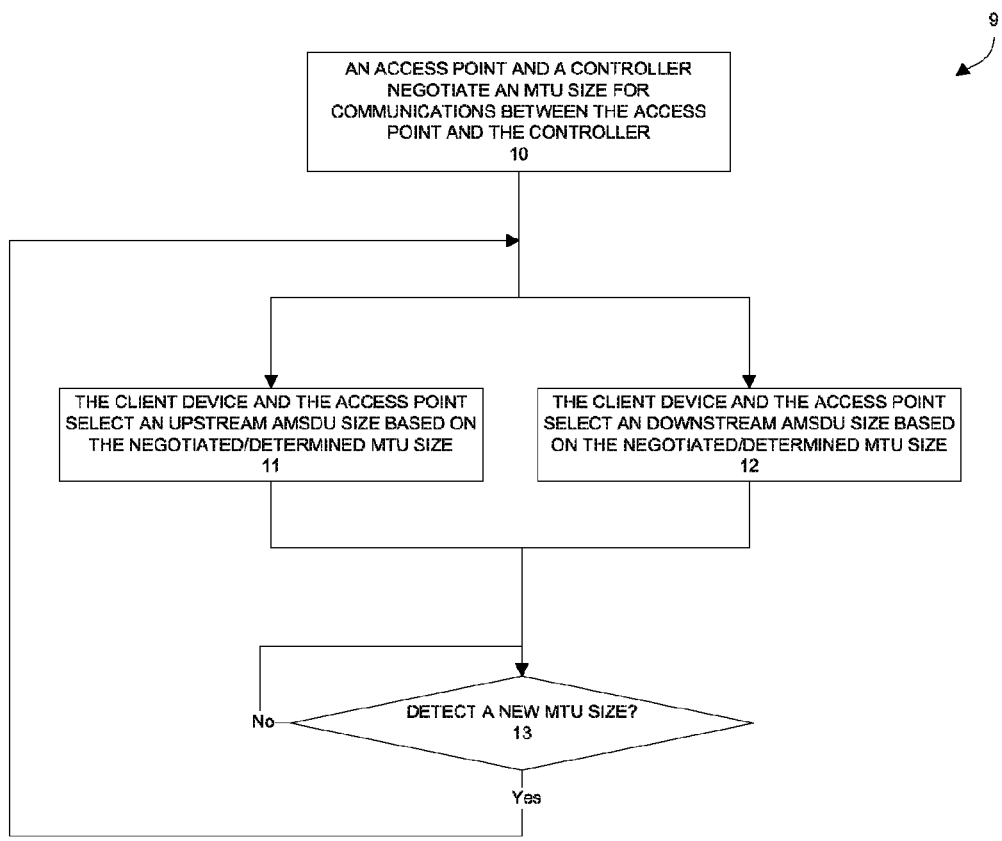
FIG. 4 shows a method for determining upstream and downstream AMSDUs sizes for communications between client devices, an access point, and a controller in accordance with one or more embodiments.

As described above, the upstream and downstream AMSDUs sizes are determined based on the MTU size for the secure tunnel between the access point 3 and the controller 4. FIG. 4 shows a method 9 for determining the upstream and downstream AMSDUs sizes for communications between the client devices 2, the access point 3, and the controller 4 according to one embodiment. The method 9 may be performed by one or more elements of the network system 1. For example, in one embodiment each of the client devices 2 perform the operation of the method 9 in conjunction with the access point 3.

In one embodiment, the method 9 begins at operation 10 with the controller 4 and the access point 3 negotiating an MTU size for the secure tunnel between the access point 3 and the controller 4. In one embodiment, the MTU size may be negotiated to be one of 6000 bytes and 9000 bytes. The MTU size may be determined based on the capabilities and configuration of the networking devices within the network 7.

Upon determining/negotiating a MTU size, operations 11 and 12 select upstream and downstream AMSDU sizes, respectively. In one embodiment, the upstream and downstream AMSDU sizes are selected based on the MTU size between the access point 3 and the controller 4, which was determined at operation 10. In one embodiment, the upstream and downstream AMSDU sizes may be each selected to be less than or equal to the MTU size for the secure tunnel between the access point 3 and the controller 4. For example, when the MTU size between the access point 3 and the controller 4 is 9000 bytes, the upstream and downstream AMSDU sizes may be set to either 3895 bytes or 7991 bytes. Although both the upstream and downstream AMSDU sizes may be set based on the MTU size, in some embodiments the upstream and downstream AMSDU sizes are distinct and different. For example, when the MTU size between the access point 3 and the controller 4 is 9000 bytes, the upstream AMSDU size may be set to 3895 bytes and the downstream AMSDU size may be set to 7991 bytes.

The selected AMSDU sizes may be utilized for upstream and downstream communications between the client devices 2 and the remote devices 5. At operation 13, the method 9 determines/detects if a new MTU size has been set between the access point 3 and the controller 4. If a new MTU size is detected, the method 9 moves back to operations 11 and 12 to select new upstream and downstream AMSDU sizes, respectively. As described above, the upstream and downstream AMSDU sizes are selected based on the MTU size between the access point 3 and the controller 4. In one embodiment, the upstream and downstream AMSDU sizes may be set to be less than or equal to the MTU size for the secure tunnel between the access point 3 and the controller 4. By setting the upstream and downstream AMSDU sizes to be less than or equal to the MTU size, each AMSDU may be transported in a single MTU without fragmentation. By eliminating fragmentation of AMSDUs during transmission between the access point 3 and the controller 4, performance of the upstream and downstream datapaths are improved through the elimination of fragmentation processing delays.

An embodiment of the invention may be an article of manufacture in which a machine-readable medium (such as microelectronic memory) has stored thereon instructions which program one or more data processing components (generically referred to here as a "processor") to perform the operations described above. In other embodiments, some of these operations might be performed by specific hardware components that contain hardwired logic (e.g., dedicated digital filter blocks and state machines). Those operations might alternatively be performed by any combination of programmed data processing components and fixed hardwired circuit components. Also, although the discussion focuses on uplink medium control with respect to frame aggregation, it is contemplated that control of other types of messages are applicable.

Any combination of the above features and functionalities may used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
   determining a maximum transmission unit (MTU) size for communications in a secure tunnel between a controller and an access point;
   negotiating, by the access point with a client device associated with the access point, an upstream aggregated MAC service data unit (AMSDU) size for upstream communications between the access point and the controller, wherein the upstream AMSDU size is less than or equal to the determined MTU size to avoid fragmentation and reassembly of an upstream AMSDU transmitted in a single MTU;
   deaggregating, by the access point, a packet received from the client device into two or more AMSDUs based on the negotiated AMSDU size; and
   transmitting, by the access point, the two or more AMSDUs to the controller.

2. The method of claim 1, further comprising:
   negotiating, by the access point with a client device associated with the access point, a downstream AMSDU size for downstream communications between the access point and the controller, wherein the downstream AMSDU size is less than or equal to the determined MTU size to avoid fragmentation and reassembly of a downstream AMSDU transmitted in a single MTU.

3. The method of claim 2, wherein the downstream and upstream AMSDU sizes are different sizes.

4. The method of claim 2, wherein the downstream and upstream AMSDU sizes are each separately selected to be one of 3895 bytes, 7991 bytes, and 11454 bytes.

5. The method of claim 1, wherein the secure tunnel carries an encrypted payload.

6. The method of claim 5, wherein the controller aggregates packets received from an external device over a network into downstream AMSDUs, encrypts the downstream AMSDUs, and transmits each encrypted downstream AMSDU to the access point, wherein the downstream AMSDUs have a size equal to the downstream AMSDU size.

7. The method of claim 5, wherein the client device aggregates packets generated by the client device into upstream AMSDUs, encrypts the upstream AMSDUs, aggregates the encrypted upstream AMSDUs into an aggregated MAC protocol data unit (AMPDU) and transmits the AMPDU to the access point, wherein the upstream AMSDUs have a size equal to the upstream AMSDU size.

8. The method of claim 1, further comprising:
   negotiating, by the controller and the access point, the MTU size for the secure tunnel between the controller and the access point.

9. The method of claim 1, further comprising:
   detecting that the MTU size has changed to a new MTU size;
   selecting, in response to detecting the new MTU size, a new upstream AMSDU size for upstream communications between the client device and the access point based on the new MTU size, wherein the selected new upstream AMSDU size avoids fragmentation and reassembly of an upstream AMSDU transmitted in a single MTU; and
   selecting, in response to detecting the new MTU size, a new downstream AMSDU size for downstream communications between the client device and the access point based on the new MTU size, wherein the selected new downstream AMSDU size avoids fragmentation and reassembly of a downstream AMSDU transmitted in a single MTU.

10. A client device for selecting aggregated MAC service data unit (AMSDU) sizes, comprising:
a wireless interface for coupling the client device to an access point;
an AMSDU negotiator for negotiating with the access point (1) an upstream AMSDU size for upstream communications between a controller and the access point based on a maximum transmission unit (MTU) size that indicates the size of MTUs transmitted between the access point and the controller through a secure tunnel and (2) a downstream AMSDU size for downstream communications between the controller and the access point based on the MTU size, wherein the selected upstream and downstream AMSDU sizes are each less than or equal to the MTU size to avoid fragmentation and reassembly of an AMSDU transmitted in a single MTU; and
an AMSDU aggregator for aggregating a first plurality of packets to be transmitted to the controller into an AMSDU based on the upstream AMSDU size and for deaggregating a received AMSDU packet into a second plurality of packets based on the downstream AMSDU size.

11. The client device of claim 10, further comprising:
an aggregated MAC protocol data unit (AMPDU) aggregator for aggregating a plurality of encrypted AMSDUs into an AMPDU to be transmitted to the access point.

12. The client device of claim 10, wherein the downstream and upstream AMSDU sizes are different sizes.

13. The client device of claim 10, wherein the downstream and upstream AMSDU sizes are each separately selected to be one of 3895 bytes, 7991 bytes, and 11454 bytes.

14. The client device of claim 10, wherein the secure tunnel carries an encrypted payload.

15. The client device of claim 10, further comprising:
an encryptor for encrypting the upstream AMSDU generated by the AMSDU aggregator.

16. The client device claim 10, further comprising:
a decryptor for decrypting an encrypted downstream AMSDU received from the access point into a downstream AMSDU.

17. A non-transitory machine-readable storage medium that stores instructions which, when executed by a processor, perform a plurality of operations comprising:
determining a maximum transmission unit (MTU) size for communications in a secure tunnel between a controller and an access point;
negotiating, by the access point with a client device associated with the access point, an upstream aggregated MAC service data unit (AMSDU) size for upstream communications between the controller and the access point, wherein the upstream AMSDU size is less than or equal to the determined MTU size to avoid fragmentation and reassembly of an upstream AMSDU transmitted in a single MTU;
deaggregating a packet received from the client device into two or more AMSDUs based on the negotiated AMSDU size; and
transmitting the two or more AMSDUs to the controller.

18. The medium of claim 17, further comprising:
negotiating with a client device associated with the access point a downstream AMSDU size for downstream communications between the access point and the controller, wherein the downstream AMSDU size is less than or equal to the determined MTU size to avoid fragmentation and reassembly of a downstream AMSDU transmitted in a single MTU.

19. The medium of claim 18, wherein the downstream and upstream AMSDU sizes are different sizes.

20. The medium of claim 18, wherein the downstream and upstream AMSDU sizes are each separately selected to be one of 3895 bytes, 7991 bytes, and 11454 bytes.

21. The medium of claim 17, wherein the secure tunnel carries an encrypted payload.

22. The medium of claim 21, wherein the controller aggregates packets received from an external device over a network into downstream AMSDUs, encrypts the downstream AMSDUs, and transmits each encrypted downstream AMSDU to the access point, wherein the downstream AMSDUs have a size equal to the downstream AMSDU size.

23. The medium of claim 21, wherein the client device aggregates packets generated by the client device into upstream AMSDUs, encrypts the upstream AMSDUs, aggregates the encrypted upstream AMSDUs into an aggregated MAC protocol data unit (AMPDU) and transmits the AMPDU to the access point, wherein the upstream AMSDUs have a size equal to the upstream AMSDU size.

24. The medium of claim 17, wherein the plurality of operations further comprise:
negotiating the MTU size for the secure tunnel between the controller and the access point.

25. The medium of claim 17, wherein the plurality of operations further comprise:
detecting that the MTU size has changed to a new MTU size;
selecting, in response to detecting the new MTU size, a new upstream AMSDU size for upstream communications between the client device and the access point based on the new MTU size, wherein the selected new upstream AMSDU size avoids fragmentation and reassembly of an upstream AMSDU transmitted in a single MTU; and
selecting, in response to detecting the new MTU size, a new downstream AMSDU size for downstream communications between the client device and the access point based on the new MTU size, wherein the selected new downstream AMSDU size avoids fragmentation and reassembly of a downstream AMSDU transmitted in a single MTU.

* * * * *